(12) United States Patent
Gossard

(10) Patent No.: US 12,270,724 B2
(45) Date of Patent: Apr. 8, 2025

(54) METHOD AND ARRANGEMENT FOR ASCERTAINING AN EMITTED AMOUNT OF SUBSTANCE

(71) Applicant: DEERE & COMPANY, Moline, IL (US)

(72) Inventor: Christophe Gossard, Weinheim (DE)

(73) Assignee: Deere & Company, Moline, IL (US)

(*) Notice: Subject to any disclaimer, the term of this patent is extended or adjusted under 35 U.S.C. 154(b) by 272 days.

(21) Appl. No.: 17/755,458

(22) PCT Filed: Oct. 23, 2020

(86) PCT No.: PCT/EP2020/079930
§ 371 (c)(1),
(2) Date: Apr. 29, 2022

(87) PCT Pub. No.: WO2021/083811
PCT Pub. Date: May 6, 2021

(65) Prior Publication Data
US 2022/0390327 A1 Dec. 8, 2022

(30) Foreign Application Priority Data
Oct. 31, 2019 (DE) .......................... 102019216843.4

(51) Int. Cl.
*G01M 15/10* (2006.01)
*G07C 5/08* (2006.01)

(52) U.S. Cl.
CPC ............. *G01M 15/102* (2013.01); *G07C 5/08* (2013.01)

(58) Field of Classification Search
CPC .................................................. G01M 15/102
See application file for complete search history.

(56) References Cited

U.S. PATENT DOCUMENTS

| 6,882,929 B2 | 4/2005 | Liang et al. |
| 2006/0201141 A1* | 9/2006 | Miller ................... F01N 3/0871 60/285 |
| 2007/0233326 A1 | 10/2007 | Jayachandran |

(Continued)

FOREIGN PATENT DOCUMENTS

| DE | 102011012238 A1 | 12/2011 |
| DE | 112009003516 T5 | 5/2012 |

(Continued)

OTHER PUBLICATIONS

German Search Report issued in application No. DE102019218395.6 dated Aug. 12, 2020 (10 pages).

(Continued)

*Primary Examiner* — Jamel E Williams
*Assistant Examiner* — Alex T Devito

(57) ABSTRACT

A method and arrangement for ascertaining an amount of substance emitted as a result of the operation of a functional unit of a vehicle includes transmitting signals from a signal source, which are generated independently of the amount of substance to be ascertained, as input data, to a data processing apparatus. The data processing apparatus contains at least one neural network as a trained model for processing the input data. The method includes generating output data representing the emitted amount of substance in the data processing apparatus using the at least one neural network.

17 Claims, 2 Drawing Sheets

(56) References Cited

U.S. PATENT DOCUMENTS

2008/0201054 A1    8/2008  Grichnik et al.
2009/0300422 A1   12/2009  Grichnik et al.

FOREIGN PATENT DOCUMENTS

| DE | 102011009179 A1 | 7/2012 | | |
|----|-----------------|--------|---|---|
| DE | 102019102835 A1 | 8/2019 | | |
| EP | 1402935 A1 | * | 3/2004 | ......... B01D 53/0454 |
| WO | WO2021083811 A1 | 5/2021 | | |

OTHER PUBLICATIONS

Lim et al. "Artificial neural network approach for prediction of ammonia emission from field-applied manure and relative significance assessment of ammonia emission factors" European Journal of Agronomy, Elsevier, Amsterdam, NL, vol. 26, No. 4, Mar. 30, 2007 (Mar. 30, 2007), pp. 425-434.

The International Search Report and the Written Opinion of the International Searching Authority issued in counterpart application No. PCT/EP2020/079930 dated Feb. 18, 2021 (10 pages).

\* cited by examiner

METHOD AND ARRANGEMENT FOR ASCERTAINING AN EMITTED AMOUNT OF SUBSTANCE

CROSS-REFERENCE TO RELATED APPLICATIONS

This application is a national stage application, filed under 35 U.S.C. 371, of International Patent Application No. PCT/EP2020/079930, filed on Oct. 23, 2020, which claims priority to German Patent Application DE102019216843.4, filed Oct. 31, 2019, which are hereby incorporated by reference in their entireties.

BACKGROUND

The present disclosure relates to a method for ascertaining an amount of substance emitted as a result of the operation of a functional unit of a vehicle.

SUMMARY

According to an aspect of the present disclosure, a method for ascertaining an amount of substance emitted as a result of the operation of a functional unit of a vehicle includes transmitting signals from a signal source, which are generated independently of the amount of substance to be ascertained, as input data, to a data processing apparatus, wherein the data processing apparatus contains at least one neural network as a trained model for processing the input data, and generating output data representing the emitted amount of substance in the data processing apparatus using the at least one neural network.

The emitted amount of substance may include at least one of substances NOx, CO2, CO, HC, N, NH4, P, and K. The functional unit may include at least one of an internal combustion engine, an exhaust gas post-treatment system, a filling device, and an application device. Signals from the signal source may represent a parameter of the functional unit. Signals from the signal source may represent values of at least one of the following parameters: an exhaust gas temperature, a torque of an internal combustion engine, a speed of an internal combustion engine, and a variable influencing the slurry composition. Signals generated independently of the amount of substance to be ascertained may be provided by at least one of the following signal sources: at least one sensor, and a control unit. Input data may be transmitted to the data processing apparatus on the basis of a comparison between signals from a signal source and at least one predefined reference value. The predefined reference value, as a calibration value, may represent a calibration state of the functional unit. The signal from the signal source may represent an actual state of the functional unit. Input data may be transmitted to the data processing apparatus if the value of the signal from the signal source is greater than the at least one predefined reference value.

An arrangement for ascertaining an amount of substance emitted as a result of an operation of a functional unit of vehicle includes a signal source for providing signals, which are generated independently of the amount of substance to be ascertained, a processor, which receives the signals as input data and contains at least one neural network as a trained model for processing the input data, and an output of the processor for outputting output data, which are generated using the at least one neural network and represent the emitted amount of substance.

The arrangement may be configured to check compliance with a predetermined limit value of the emitted amount of substance.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Figure 1:
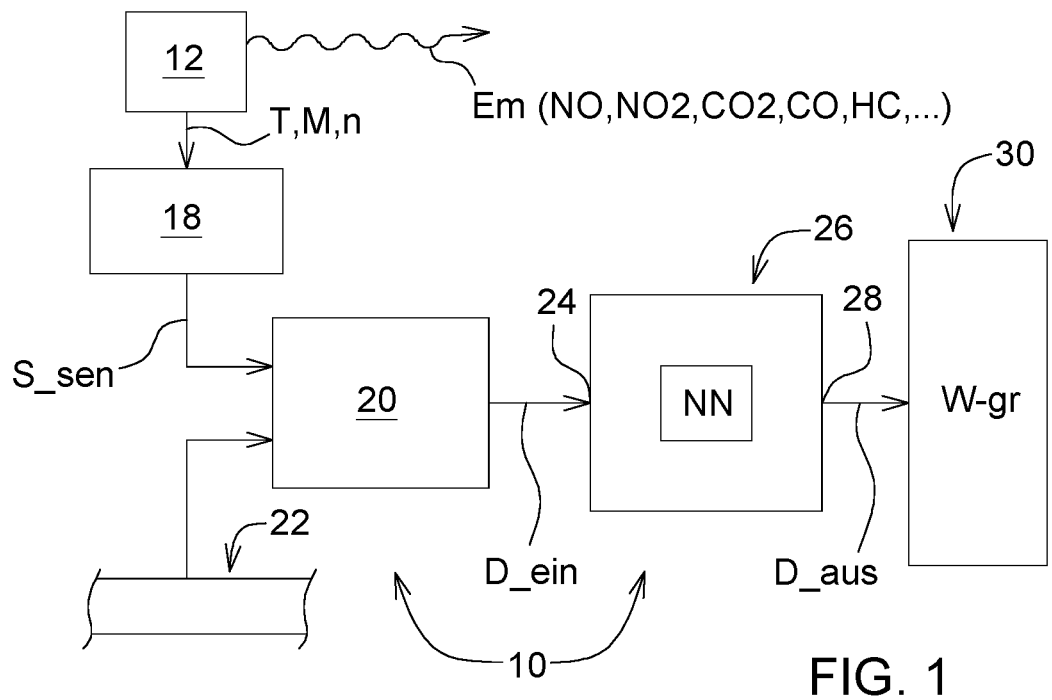
FIG. 1 illustrates a method and arrangement in accordance with an embodiment of the present disclosure.

An important criterion for vehicles, such as utility vehicles and/or agricultural utility vehicles to name non-limiting examples, are emissions of specific substances during operation of their internal combustion engine. Amounts or concentrations of these emitted substances are measured and are checked for compliance with predetermined limit values.

The present disclosure is based on the object of ascertaining an amount of substance emitted as a result of the operation of a functional unit of an agricultural utility vehicle with little technical effort.

The use of the data processing apparatus with the at least one neural network makes it possible for input data to be able to be processed reliably with a high degree of accuracy, on the one hand, and with little technical effort, on the other hand. Such artificial intelligence requires only a specific definition phase and a specific learning phase (training phase) until it provides sufficiently accurate output data for correctly ascertaining the amount of substance. After these definition and learning phases have been completed, this artificial intelligence, as a software-based model, in particular an algorithm-based model, is suitable for being used as a technical model and therefore for being used as a replacement for a technically complicated and correspondingly cost-intensive sensor system in the utility vehicle.

It is therefore possible to avoid, for example, an expensive sensor system for ascertaining an emitted concentration of nitrogen oxide (NOx). Rather, the amount of the respectively emitted substance can be ascertained in a technically simple and cost-effective manner by combining signals which are available in the utility vehicle anyway (for example sensor system, control unit, CAN bus) with the at least one neural network. In this case, the respective neural network or model may be trained, in the definition and learning phases, with the aid of precisely such signals which are available in the utility vehicle anyway. During operation of the functional unit, the data processing apparatus or its at least one neural network can then be used as a trained, virtual sensor system in order to ascertain the relevant amount of substance in a technically reliable and cost-effective manner.

Different emitted substances, which are each analyzed or tested with respect to their emitted amount (for example concentration, number of particles, particle flow, volume flow), are conceivable as the ascertained amount of substance. The specific amount of substance can be analyzed or ascertained independently of its physical state (solid, liquid, gaseous). Individual substances having a plurality of physical states at the same time can also be checked, with respect to their amount, by an appropriately designed data processing apparatus.

The data processing apparatus and its at least one neural network may be designed to analyze a single substance and consequently to ascertain a single specific amount of substance. Alternatively, the data processing apparatus is designed with appropriately trained neural networks in such a manner that it is suitable for analyzing a plurality of different specific substances.

Substances which may be analyzed with respect to their emitted amount of substance are various nitrogen oxides NOx such as NO and NO2, carbon dioxide (CO2), carbon monoxide (CO), hydrocarbon (CH). These substances are relevant, for example, during operation of an internal combustion engine as a functional unit.

Further substances to be ascertained may be ammonium (NH4) and the chemical elements N, P, K, wherein these elements can be ascertained in elemental form or in compound form, for example nitrogen compounds, nitrate (NO3), phosphate (P2O5), potash (K2O). These substances are relevant, for example, when applying organic fertilizer or slurry, such as during operation of a filling or application device of a slurry trailer.

The nitrate concentration in the soil (for example of a field or a meadow) can also be ascertained as an emitted amount of substance. In this case, the amount of nitrate or nitrate concentration is emitted indirectly by applying slurry or nitrogen to the soil and by subsequent conversion in the soil.

The method can be applied to different functional units which emit an amount of substance to be analyzed or ascertained. In particular, an internal combustion engine or an exhaust gas post-treatment system of the utility vehicle is conceivable as a functional unit. Furthermore, implements or subunits of the latter are also conceivable as a functional unit of the agricultural utility vehicle since they perform a function when the utility vehicle is used for work. For example, these are a filling or application device (for example nozzle, valve, line) for slurry, for example on a slurry trailer. In all cases, a technically complicated and accordingly cost-intensive sensor system and measurement apparatus can be avoided when using the method according to the disclosure.

Signals from the respective signal source may represent one or more parameters of the functional unit. In particular, the signals are used to represent a current state or actual state of the functional unit with respect to a parameter. The data processing apparatus can therefore continuously take into account a current state of the functional unit.

Suitable signals as input data for the data processing apparatus are, for example, parameter values of at least one of the following parameters: an exhaust gas temperature of the combustion gases of an internal combustion engine of the agricultural utility vehicle, a torque of the internal combustion engine, a speed of the internal combustion engine. Further parameters may be environmental conditions (for example temperature, external air pressure) or other technical parameters in the functional unit.

The above-mentioned parameters are suitable, in particular, in the case of an internal combustion engine or an exhaust gas post-treatment system as a functional unit.

In the case of a filling or application device for slurry (for example arranged on a slurry trailer) as a functional unit, variables influencing the slurry composition (for example the type of animal, the feed of the animals, the type and/or duration of the storage of the slurry) can be used as parameters.

In the case of a nitrate concentration of the soil as the amount of substance to be ascertained, apart from the above-mentioned parameters, the following parameters come into consideration, for example, in connection with the filling or application device for slurry as a functional unit: different weather conditions, solar radiation, surface composition of the affected field.

On the one hand, the signals of the parameters are independent of direct ascertainment of an amount of substance and are simultaneously related to the current state and current properties of the functional unit. On the other hand, these parameters are routinely available in many cases in the utility vehicle, in particular by virtue of a sensor system. The technical effort needed to provide signals which are independent of the amount of substance for the purpose of ascertaining the amount of substance therefore remains low.

At least one sensor, a combination of a plurality of sensors or a control unit may be provided for the purpose of generating and providing the signals which are independent of the amount of substance. These signal sources have the advantage that they are already routinely available in many cases in the utility vehicle without additional outlay. In this case, the control unit can also receive signals from a control and/or data bus (for example CAN) and can provide them as signals which are independent of the amount of substance. Sensor signals derived from a family of characteristic curves may also be provided using the control unit. In other cases, the sensor or the sensor system may be part of a unit outside the utility vehicle, for example a satellite, drone, weather station. The signals or data therefrom can then be initially supplied to a control unit or can be directly transmitted to the data processing apparatus as input data. Data from a data network (for example the Internet) can also be used as input data. The latter data may possibly be initially supplied to a control unit which then transmits the relevant data to the data processing unit as input data.

Input data may be transmitted to the data processing apparatus on the basis of a comparison between signals from a signal source and at least one predefined reference value. This makes it possible for input data to be transmitted only on the basis of a particular comparison result. A suitable comparison can therefore be taken as a basis for controlling the fact that an analyzed amount of substance is not ascertained continuously, but rather only under specifically determined conditions, namely only when the ascertainment appears to be necessary. This advantageously reduces the number of data transactions and the required computing capacity. Depending on the data transmission medium used, this reduction also has a cost-saving effect.

In one embodiment, the predefined reference value is effective as a calibration value which represents a calibration state of the functional unit. This calibration state can then be compared with a current actual state of the functional unit that is represented by signals from the signal source. For example, the calibration state of an internal combustion engine is predefined by reference values, in particular maximum values which should not be exceeded, which are obtained beforehand in a test phase or during homologation of the internal combustion engine. These reference values relate, for example, to a maximum torque of the internal combustion engine, a maximum speed of the internal combustion engine or a maximum exhaust gas temperature of the combustion gases. A comparison between the calibration state and the actual state is therefore suitable as a preliminary check for efficiently deciding whether an emitted amount of substance actually needs to be ascertained.

In particular, input data are transmitted to the data processing apparatus only when the value of the signal from the signal source (for example a measured torque of the internal combustion engine) is greater than the predefined reference value (for example a maximum torque determined during the homologation of the internal combustion engine). For the purpose of data economy, an emitted amount of substance would therefore be ascertained only when there is an indication of a potentially excessively high amount of substance.

An arrangement for ascertaining an amount of substance emitted as a result of the operation of a functional unit of an agricultural utility vehicle has a signal source and a data processing apparatus.

The signal source is used to provide signals which are generated independently of the amount of substance. These signals therefore do not represent an amount of substance, but form input data for the data processing apparatus. The latter in turn outputs, at an output, output data which are generated using at least one neural network implemented in the data processing apparatus and represent the emitted amount of substance. Therefore, the amount of the respectively emitted substance can be ascertained in a technically simple and cost-effective manner by combining, for example, signals which are available in the utility vehicle anyway (for example sensor system, control unit) with the at least one neural network.

The arrangement may be used to ascertain the emitted amount of substance and to check whether it complies with a predetermined limit value. This may be, for example, a legislatively stipulated maximum value which should be complied with or should not be exceeded. For this purpose, the output data from the data processing apparatus may be supplied, for example, to a downstream checking stage having a corresponding comparison algorithm.

The vehicle of one or more embodiments may be an agricultural utility vehicle, such as a tractor, a harvesting machine, or a field chopper in non-limiting examples.

Figure 2:
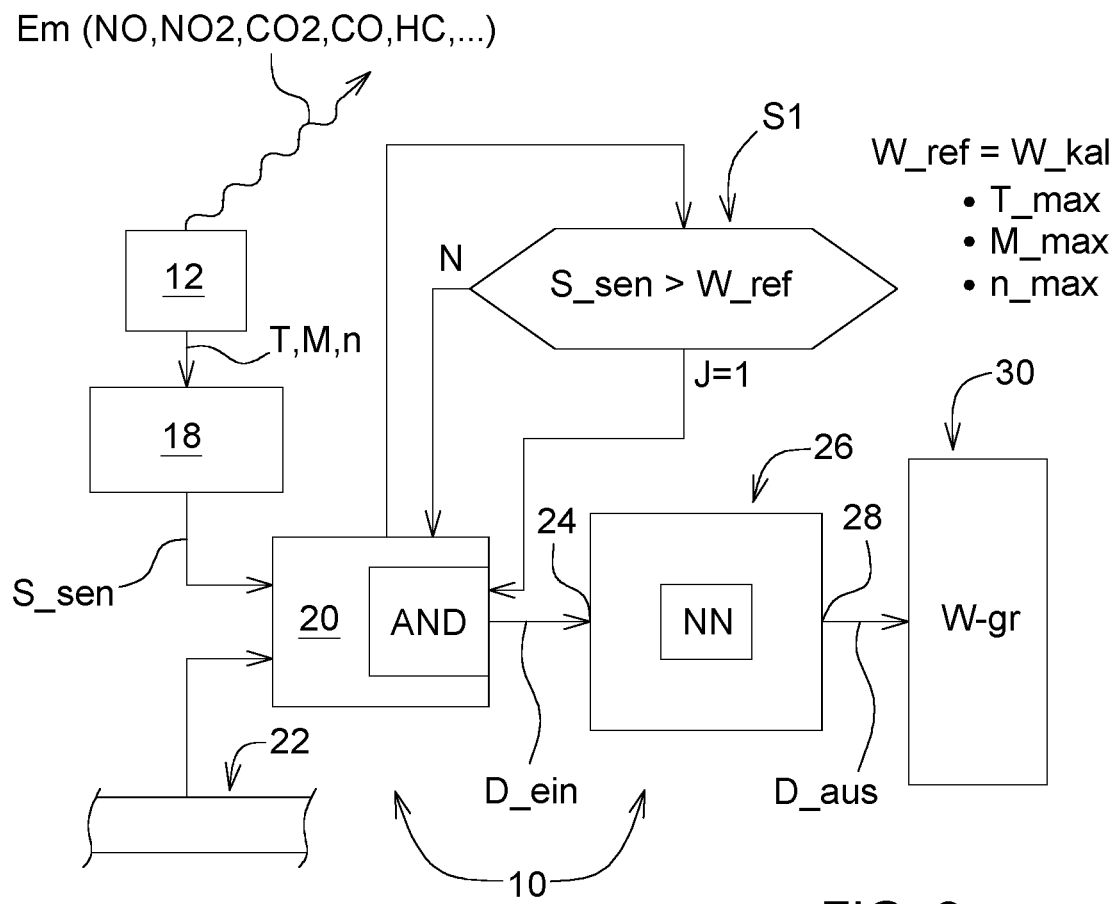
FIG. 2 illustrates a method and arrangement in accordance with an embodiment of the present disclosure.

FIG. 1 shows an arrangement 10 having a plurality of components for ascertaining an amount of substance Em emitted as a result of the operation of a functional unit 12, 14 of an agricultural utility vehicle, in particular a tractor. In FIG. 1 and FIG. 2, the functional unit 12 is an internal combustion engine of the utility vehicle, whereas, in the embodiment according to FIG. 3, the functional unit 14 is in the form of an application device for slurry which is illustrated only schematically. This application device 14 is part of a slurry trailer 16 which is pulled by the utility vehicle during operation.

According to FIG. 1, a sensor system 18 captures current values of parameters of the internal combustion engine 12, for example an exhaust gas temperature T, a torque M and an engine speed of the internal combustion engine 12. For the sake of simplicity, the sensor system 18 is mentioned here as an umbrella term for the individual sensors needed to capture the parameters. The sensor signals S_sen which are generated by means of the sensor system 18 independently of the amount of substance Em to be ascertained are supplied to a control unit 20. The control unit 20 may contain the functionalities required for signal or data processing, for instance a reading and/or writing unit, a memory unit, a processor. In addition, signals or data from a data and/or control bus 22 are also supplied to the control unit 20. This bus 22 may be present in the vehicle, for example a CAN bus.

The control unit 20 transmits received signals or data from the sensor system 18 or the bus 22 to an input 24 of a data processing apparatus 26, possibly in a processed form, as input data D_ein. The data processing apparatus 26 may also be referred to herein as a processor.

Alternatively, the sensor signals S_sen can also be directly transmitted to the data processing apparatus 26 without the interposition of the control unit 20.

The data processing apparatus 26 contains at least one neural network NN which is in the form of a trained, software-based model for processing the input data D_ein. The at least one neural network NN forms, as it were, a virtual sensor system which replaces direct measurement of the emitted amount of substance Em.

Output data D_aus, which are present at an output 28 of the data processing apparatus 26 and represent the emitted amount of substance Em, are generated in the data processing apparatus 26 using the at least one neural network NN.

The output data D_aus are supplied to a checking stage 30 in which the output data D_aus are compared with a predetermined limit value W_gr, possibly in a data form which has been processed further. The comparison is used to check whether the predetermined limit value W_gr is complied with, in particular is not exceeded, with the value of the output data D_aus—and consequently with the value of the computationally ascertained amount of substance Em. In the checking stage 30, information which is dependent on the comparison result can also be generated and output for users or third parties. Furthermore, measures can be initiated in the checking stage 30, for example by outputting appropriate control signals.

The arrangement according to FIG. 2 differs from the embodiment according to FIG. 1 substantially in that signals S_sen from the sensor system 18 are compared with a predefined reference value W_ref during a comparison step S1 in the control unit 20. Input data D_ein are transmitted to the data processing apparatus 26 on the basis of the comparison result in the comparison step S1.

In the exemplary embodiment, the reference value W_ref corresponds to a calibration value W_kal which represents a calibration state of the internal combustion engine 12. The calibration state is defined in advance by means of a test phase or homologation of the internal combustion engine 12. In other words, a permissible operating range for the internal combustion engine 12 is defined thereby. The calibration value W_kal therefore corresponds, for example, to a maximum permissible exhaust gas temperature T_max, a maximum permissible torque M_max or a maximum permissible speed n_max of the internal combustion engine 12.

Signals S_sen from the sensor system 18 represent a captured actual state of the internal combustion engine 12 since the sensor system 18 captures current values of individual parameters of the internal combustion engine 12, for example the current exhaust gas temperature T, the current torque M and/or the current engine speed n.

In the comparison step S1, the calibration state of the internal combustion engine 12 is therefore compared with its actual state with respect to selected parameters. If the comparison reveals that the current value of the selected parameter does not exceed the predefined reference value W_ref or the calibration value W_kal (this means S_sen≤W_ref), the control unit 20 decides not to transmit any input data D_ein to the data processing apparatus 26. In contrast, if the comparison reveals that the current value of the parameter under consideration exceeds the predefined reference value W_ref or the calibration value W_kal (this means S_sen>W_ref), the control unit 20 causes input data D_ein to be transmitted to the data processing apparatus 26. For this purpose, the binary value J=1 can be assigned to the YES output of the comparison step S1, which binary value, by virtue of its processing in an AND operator AND, causes the control unit 20 to transmit the input data D_ein.

Therefore, by means of the comparison step S1, input data D_ein are transmitted to the data processing apparatus 26 only when operation of the internal combustion engine 12 outside its calibration state has been determined. Only then is it possible for an excessively high emitted amount of substance Em to be produced, which is therefore calculated by means of the data processing apparatus 26. The comparison step S1 therefore avoids unnecessary data transactions if the internal combustion engine 12 is operating within its predefined calibration state.

In the embodiments according to FIG. 1 and FIG. 2, the arrangement 10 ascertains an emitted amount of substance Em of at least one of the substances NO, NO2, CO2, CO, HC. These substances are of interest in connection with operation of the internal combustion engine 12.

Figure 3:
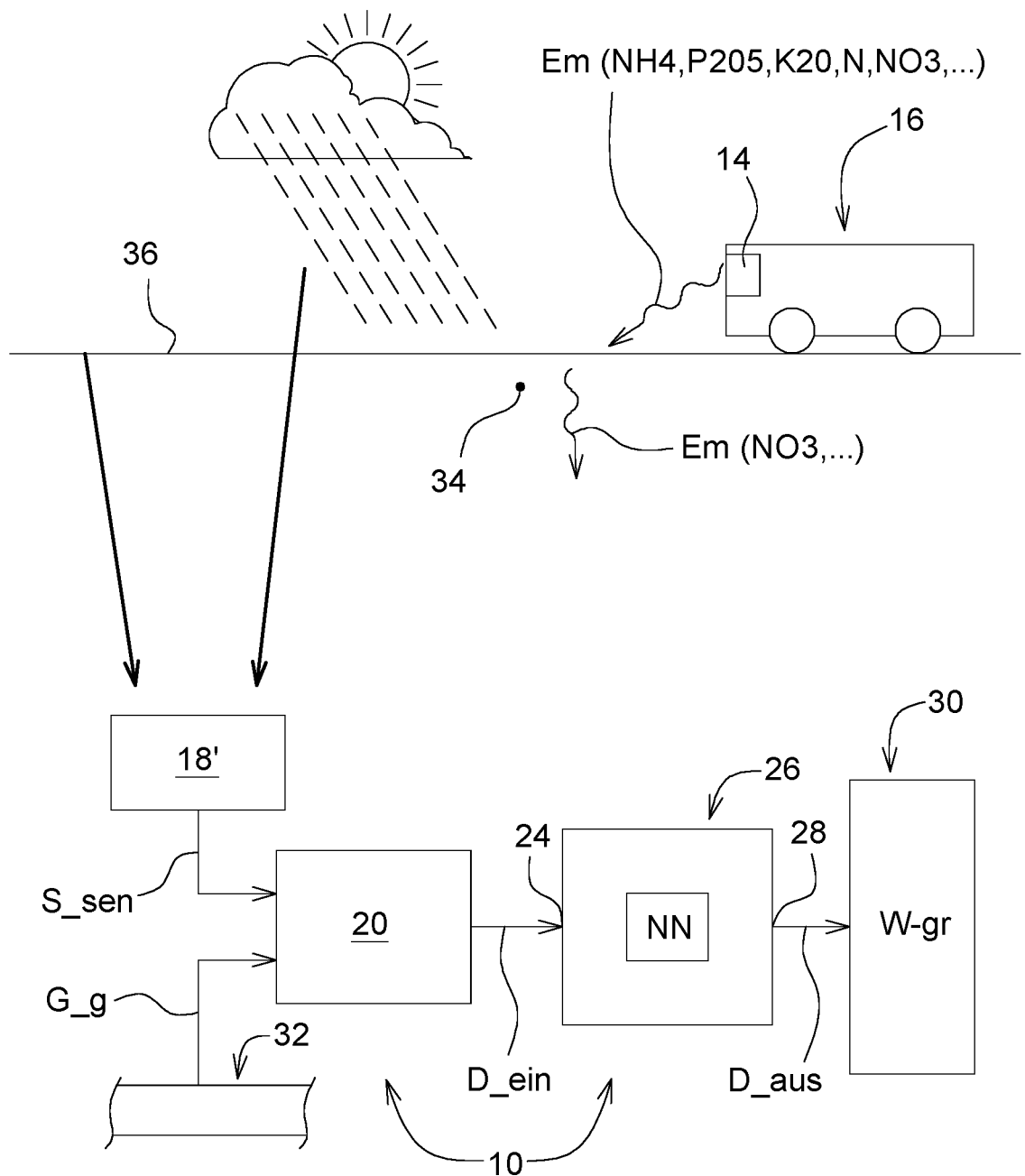
FIG. 3 illustrates a method and arrangement in accordance with an embodiment of the present disclosure.

In contrast, the arrangement 10 according to FIG. 3 ascertains an emitted amount of substance Em in connection with the application of slurry to an agricultural area. For example, the amount of substance Em of at least one of the following substances is ascertained in this case: ammonium (NH4), phosphate (P2O5), potash (K2O), nitrogen (N), nitrate (NO3).

In the embodiment according to FIG. 3 too, signals are generated independently of the amount of substance Em to be ascertained and are provided in the control unit 20, possibly in a processed form, in order to then be transmitted to the data processing apparatus 26 as input data D_ein. According to the intended application in FIG. 3, the neural network NN is specifically trained, as a virtual sensor system, to calculate or ascertain the emitted amount of a substance emitted as a result of applied slurry (for example NH4, P2O5, K2O, N, NO3).

The signals provided by the control unit 20 are based on sensor signals S_sen and/or signals or data from a data network 32 (for example the Internet). The latter may be used, for example, by a farmer or a user to transmit a variable G_g influencing the slurry composition to the control unit 20 as a parameter. This variable G_g can also be automatically transmitted to the control unit 20 as data from a database or as sensor signals via the data network 32.

The variable G_g influencing the slurry composition may be a type of animal producing the slurry, the feed of the animals or the type and/or duration of the storage of the slurry.

In the case of a nitrate concentration in the soil 34 as the amount of substance Em to be ascertained, apart from the above-mentioned variables G_g, the following parameters come into consideration, for example, as parameters: weather conditions, solar radiation, surface composition of the affected field 36. The values of these parameters may be captured by means of a suitable sensor system 18'. This sensor system 18' contains at least one sensor and may be at least partially part of one or more units outside the operated utility vehicle, for example a satellite, drone, weather station. The signals or data S_sen therefrom are then supplied to the control unit 20.

The nitrate concentration in the soil 34 may likewise be ascertained as an emitted amount of substance Em. In this case, the nitrate amount or concentration is emitted indirectly by applying slurry or nitrogen to the soil 34 and by subsequent conversion in the soil 34.

In FIG. 3, the output data D_aus from the data processing apparatus 26, which represent the respectively emitted amount of substance Em, are again supplied to a checking stage 30. With respect to the function of the checking stage 30 in FIG. 3, reference is made to the explanations of the embodiment according to FIG. 1.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A method for ascertaining an amount of substance emitted as a result of the operation of a functional unit of a vehicle, the method comprising:
   transmitting signals from a signal source, which are generated independently of the amount of substance to be ascertained, as input data, to a data processing apparatus, wherein the data processing apparatus contains at least one neural network as a trained model for processing the input data, wherein the signals from the signal source represent an actual state of the functional unit; and
   generating output data representing the emitted amount of substance in the data processing apparatus using the at least one neural network;
   wherein the input data are transmitted to the trained model on the basis of a comparison between the signals from the signal source and a calibration value representing a calibration state of the functional unit;
   wherein the input data are transmitted to the trained model if the value of the signals from the signal source is greater than the calibration value; and
   wherein all of the signals from the signal source having a value greater than the calibration value are transmitted to the trained model.

2. The method of claim 1, wherein the emitted amount of substance comprises at least one of substances NOx, CO2, CO, HC, N, NH4, P, and K.

3. The method of claim 1, wherein the functional unit comprises at least one of:
an internal combustion engine,
an exhaust gas post-treatment system,
a filling device, and
an application device.

4. The method of claim 1, wherein signals from the signal source represent a parameter of the functional unit.

5. The method of claim 1, wherein signals from the signal source represent values of at least one of the following parameters:
an exhaust gas temperature,
a torque of an internal combustion engine,
a speed of an internal combustion engine, and
a variable influencing the slurry composition.

6. The method of claim 1, wherein signals generated independently of the amount of substance to be ascertained are provided by at least one of the following signal sources:
at least one sensor, and
a control unit.

7. The method of claim 1, wherein the calibration value represents a predefined maximum value defining an upper end of a permissible operating range of the functional unit.

8. The method of claim 7, wherein the calibration value includes at least one of the following: a maximum torque of the functional unit, a maximum speed of the functional unit, or a maximum exhaust gas temperature of combustion gases.

9. The method of claim 1, wherein the value of the signals from the signal source is transmitted to the trained model only if the value is greater than the calibration value.

10. An arrangement for ascertaining an amount of substance emitted as a result of an operation of a functional unit of a vehicle, the arrangement comprising:
a signal source for providing signals, which are generated independently of the amount of substance to be ascertained, wherein the signals from the signal source represent an actual state of the functional unit,
a processor, which receives the signals as input data and contains at least one neural network as a trained model for processing the input data; and
an output of the processor for outputting output data, which are generated using the at least one neural network and represent the emitted amount of substance;
wherein the input data are transmitted to the trained model on the basis of a comparison between the signals from the signal source and a calibration value representing a calibration state of the functional unit;
wherein the input data are transmitted to the trained model if the value of the signals from the signal source is greater than the calibration value; and
wherein all of the signals from the signal source having a value greater than the calibration value are transmitted to the trained model.

11. The arrangement of claim 10, wherein the arrangement is configured to check compliance with a predetermined limit value of the emitted amount of substance.

12. The method of claim 10, wherein the calibration value represents a predefined maximum value defining an upper end of a permissible operating range for the functional unit.

13. The method of claim 12, wherein the calibration value includes at least one of the following: a maximum torque of the functional unit, a maximum speed of the functional unit, or a maximum exhaust gas temperature of combustion gases.

14. The method of claim 10, wherein the value of the signals from the signal source is transmitted to the trained model only if the value is greater than the calibration value.

15. An arrangement for ascertaining an amount of substance emitted as a result of an operation of an internal combustion engine of a vehicle, the arrangement comprising:
a signal source for providing signals, which are generated independently of the amount of substance to be ascertained, wherein the signals from the signal source represent an actual state of the internal combustion engine;
a processor, which receives the signals as input data and contains at least one neural network as a trained model for processing the input data;
an output of the processor for outputting output data, which are generated using the at least one neural network and represent the emitted amount of substance; and
an electronic comparison algorithm configured such that the input data are transmitted to the trained model on the basis of a comparison between the signals from the signal source and a calibration value representing a calibration state of the internal combustion engine, wherein all signals from the signal source greater than the calibration value are transmitted to the trained model, and wherein all signals from the signal source less than the calibration value are not transmitted to the trained model.

16. The arrangement of claim 15, wherein the calibration value represents a predefined maximum value defining an upper end of a permissible operating range of the internal combustion engine.

17. The arrangement of claim 16, wherein the calibration value includes at least one of the following: a maximum torque of the internal combustion engine, a maximum speed of the internal combustion engine, or a maximum exhaust gas temperature of combustion gases.

* * * * *